US010552648B2

(12) United States Patent
Huang et al.

(10) Patent No.: US 10,552,648 B2
(45) Date of Patent: *Feb. 4, 2020

(54) PROXIMITY-BASED LOCALIZATION OF WIRELESS TAGS BASED ON WIRELESS GATEWAY ASSOCIATION INFORMATION

(71) Applicants: ALCATEL LUCENT, Boulogne Billancourt (FR); ALCATEL-LUCENT USA INC., Murray Hill, NJ (US)

(72) Inventors: Howard Huang, New York, NY (US); Irwin Kennedy, Londonderry (IE); Surya Mattu, Brooklyn, NY (US); Richard Abbot, Belle Mead, NJ (US); Jonathan Ling, North Brunswick, NJ (US); Chih-Kuang Lin, Dublin (IE)

(73) Assignees: Alcatel Lucent, Nozay (FR); Nokia of America Corporation, Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/985,050

(22) Filed: May 21, 2018

(65) Prior Publication Data
US 2018/0276422 A1    Sep. 27, 2018

Related U.S. Application Data

(63) Continuation of application No. 14/674,884, filed on Mar. 31, 2015, now Pat. No. 9,977,926.

(51) Int. Cl.
*G06K 7/00*      (2006.01)
*G01S 5/10*      (2006.01)

(52) U.S. Cl.
CPC .............. *G06K 7/0008* (2013.01); *G01S 5/10* (2013.01)

(58) Field of Classification Search
None
See application file for complete search history.

(56) References Cited

U.S. PATENT DOCUMENTS 8,279,067 B2    10/2012    Berger et al.
8,396,485 B2     3/2013    Grainger et al.
(Continued)

FOREIGN PATENT DOCUMENTS

EP        2662703        11/2013

OTHER PUBLICATIONS

Al-Ali et al., "Mobile RFID Tracking System," Information and Communication Technologies: From Theory to Applications 2008 (ICTTA 2008), 3$^{rd}$ International Conference, Apr. 2008, pp. 1-4.

*Primary Examiner* — Daniell L Negron
(74) *Attorney, Agent, or Firm* — Tong, Rea, Bentley & Kim, LLC

(57) ABSTRACT

A capability for localization of a wireless tag based on wireless gateway association information uses a wireless tag supporting multiple states and wireless gateway association information associated with the wireless tag to control localization of the wireless tag. The wireless tag may support an unconnected state in which the wireless tag communicates location tracking information using a wireless beacon signal which may be detected by various wireless gateways and a connected state in which the wireless tag communicates location tracking information via one or more connections with one or more wireless gateways. The wireless gateway association information may include wireless gateway lists (e.g., whitelists, blacklists, or the like), association rules, notification rules, or the like. The wireless gateway association information may be used to control
(Continued)

transitions of the wireless tag between the unconnected state and the connected state, to control notifications for the wireless tag, or the like.

15 Claims, 4 Drawing Sheets

(56) References Cited

U.S. PATENT DOCUMENTS

| | | |
|---|---|---|
| 8,847,754 B2 | 9/2014 | Buchheim et al. |
| 9,977,926 B2 * | 5/2018 | Huang ............... G01S 5/10 |
| 2006/0085813 A1 | 4/2006 | Giraldin |
| 2006/0122944 A1 | 6/2006 | Ryan |
| 2009/0224892 A1 | 9/2009 | Nicholls |
| 2011/0109434 A1 | 5/2011 | Hadsall |
| 2012/0155349 A1 | 6/2012 | Bajic et al. |

* cited by examiner

PROXIMITY-BASED LOCALIZATION OF WIRELESS TAGS BASED ON WIRELESS GATEWAY ASSOCIATION INFORMATION

CROSS-REFERENCE TO RELATED APPLICATIONS

This application is a continuation of U.S. patent application Ser. No. 14/674,884, filed on Mar. 31, 2015, entitled PROXIMITY-BASED LOCALIZATION OF WIRELESS TAGS BASED ON WIRELESS GATEWAY ASSOCIATION INFORMATION, which is hereby incorporated herein by reference.

TECHNICAL FIELD

The disclosure relates generally to a wireless communication system and, more specifically but not exclusively, to tracking the location of a wireless tag using a wireless communication system.

BACKGROUND

In general, location-based services (LBSs) are a class of services that use location information in various contexts and for various purposes. For example, LBSs may be used to identify or track the location of objects (e.g., people, animals, end user devices, or the like) in various contexts and for various purposes (e.g., indoor object searches, providing personalized services, supporting mobile commerce, or the like). The location information that is used in LBSs may be obtained based on localization of wireless tags which may be associated with the objects. Disadvantageously, however, there may be various problems associated with existing mechanisms for localization of wireless tags.

SUMMARY OF EMBODIMENTS

Various deficiencies in the prior art are addressed by embodiments related to localization of a wireless tag.

In at least some embodiments, a wireless tag includes a wireless communication module and a controller. The wireless communication module is configured to support wireless communications of the wireless tag. The wireless tag is configured to support an unconnected state in which the wireless tag communicates location tracking information via transmission of wireless beacon signals and a connected state in which the wireless tag communicates location tracking information via a connection between the wireless tag and a wireless gateway. The controller is configured to control a transition of the wireless tag from the unconnected state to the connected state based on an indication that the wireless gateway is a trusted wireless gateway for the wireless tag. In at least some embodiments, a corresponding method for use by a wireless tag is provided. In at least some embodiments, a computer-readable storage medium stores instructions which, when executed by a computer, cause the computer to perform a corresponding method for use by a wireless tag.

In at least some embodiments, a wireless gateway includes a wireless communication module and a processor communicatively connected to the wireless communication module. The wireless communication module is configured to receive a wireless beacon signal from a wireless tag. The processor is configured to determine, based on the wireless beacon signal received from the wireless tag, whether the wireless gateway is a trusted wireless gateway for the wireless tag and to initiate establishment of a connection between the wireless tag and the wireless gateway based on a determination that the wireless gateway is a trusted wireless gateway for the wireless tag. In at least some embodiments, a corresponding method for use by a wireless gateway is provided. In at least some embodiments, a computer-readable storage medium stores instructions which, when executed by a computer, cause the computer to perform a corresponding method for use by a wireless gateway.

In at least some embodiments, a location server is configured for tracking a location of a wireless tag. The location server includes a processor and a memory communicatively connected to the processor. The processor is configured to determine wireless gateway association information associated with the wireless tag and perform a wireless tag management function for the wireless tag based on the wireless gateway association information associated with the wireless tag. In at least some embodiments, a corresponding method for use by a location server or other network element is provided. In at least some embodiments, a computer-readable storage medium stores instructions which, when executed by a computer, cause the computer to perform a corresponding method for use by a location server or other network element.

BRIEF DESCRIPTION OF THE DRAWINGS

The teachings herein can be readily understood by considering the detailed description in conjunction with the accompanying drawings, in which.

To facilitate understanding, identical reference numerals have been used, where possible, to designate identical elements common to the figures.

DETAILED DESCRIPTION OF EMBODIMENTS

A capability for localization of a wireless tag based on wireless gateway association information is presented. The capability for localization of a wireless tag based on wireless gateway association information uses a wireless tag supporting multiple states and wireless gateway association information associated with the wireless tag to control localization of the wireless tag. The wireless tag may support an unconnected state in which the wireless tag communicates location tracking information using a wireless beacon signal which may be detected by various wireless gateways and a connected state in which the wireless tag communicates location tracking information via one or more connections with one or more wireless gateways. The wireless gateway association information associated with the wireless tag may include one or more wireless gateway lists for the wireless tag (e.g., one or more wireless gateway whitelists indicative of wireless gateways trusted for the wireless tag, one or more wireless gateway blacklists indicative of wireless gateways distrusted for the wireless tag, or the like, as well as various combinations thereof) or associated rules related to wireless gateway lists for the wireless tag, one or more association rules for the wireless tag (e.g., for controlling the manner in which the wireless tag associates with or interacts with particular wireless gateways), one or more notification rules for the wireless tag (e.g., for controlling user notifications related to tracking of the location of the wireless tag), or the like, as well as various combinations thereof. The wireless gateway association information may be used to control transitions of the wireless tag between the unconnected state and the connected state and, thus, to control localization of the wireless tag. The wireless gateway association information for the wireless tag may be used to control notifications associated with the wireless tag. The capability for localization of a wireless tag based on wireless gateway association information may support end user creation and management of wireless gateway association information for the wireless tag (e.g., for creating or managing wireless gateway lists, association rules, notification rules, or the like, as well as various combinations thereof), automated creation and management of wireless gateway association information for the wireless tag, or the like, as well as various combinations thereof. These and various other embodiments and advantages of the capability for localization of a wireless tag based on wireless gateway association information may be further understood by way of reference to the exemplary wireless communication system of FIG. 1.

Figure 1:
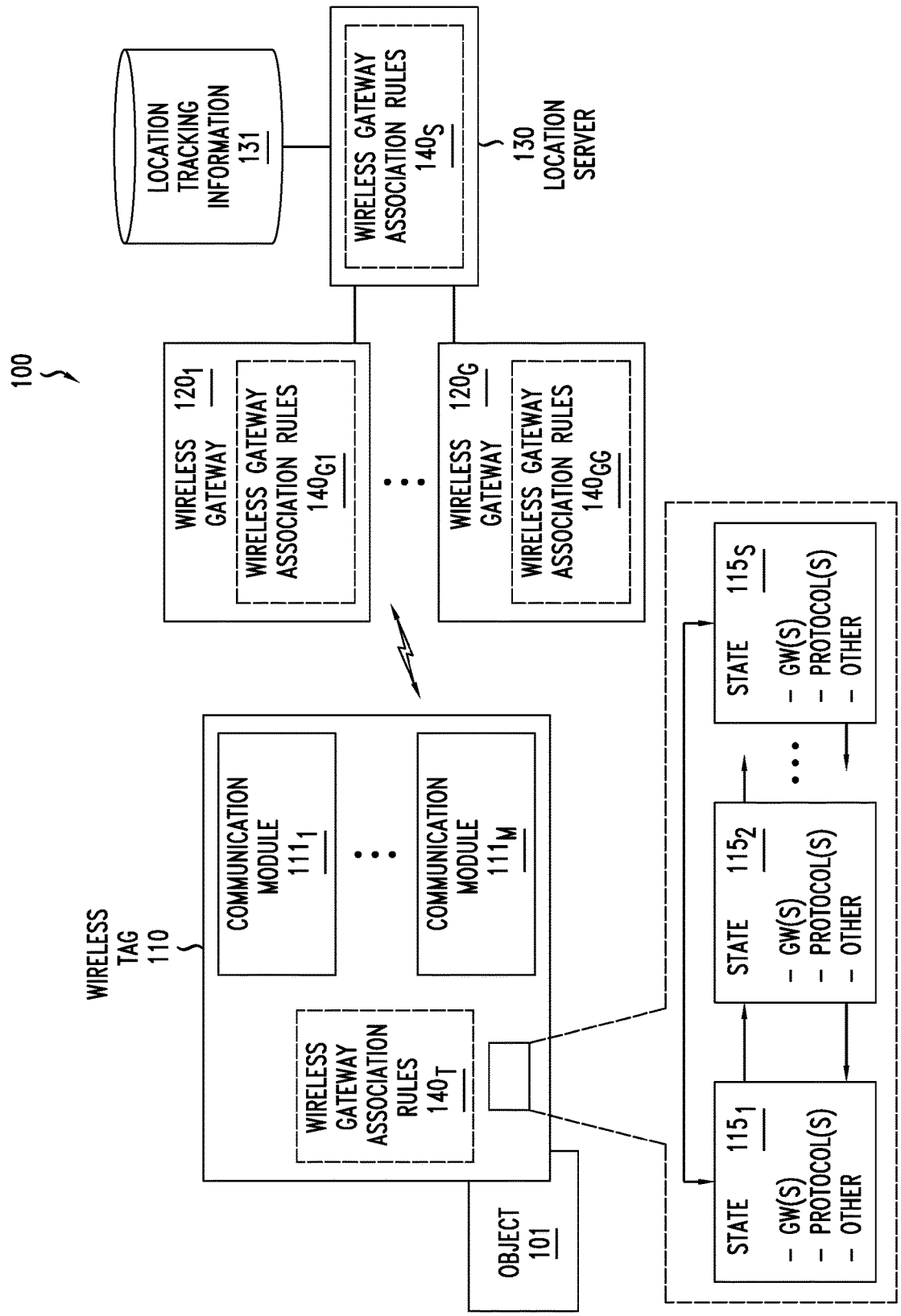
FIG. 1 depicts a wireless communication system supporting localization of a wireless tag.

FIG. 1 depicts a wireless communication system supporting localization of a wireless tag. The wireless communication system 100 includes an object 101, a wireless tag (WT) 110 associated with object 101, a set of wireless gateways (WGs) 120$_1$-120$_G$ (collectively, WGs 120), and a location server (LS) 130.

The object 101 may be any object for which location tracking may be provided using WT 110. For example, object 101 may be a person, an animal, a smartphone, a purse, a wallet, a vehicle, a bed being tracked in a healthcare environment, an item being tracked through a manufacturing process, an item being tracked through a delivery process, an item being tracked as part of an inventory of a store, an Internet-of-Things (IoT) device (e.g., a sensor, a monitor, an actuator, a controller, or the like), or any other object for which location tracking may be performed. The WT 110 may be permanently or temporarily affixed to, or otherwise associated with, the object 101. The object 101 may have static or dynamic object data associated therewith, which may be stored by the object 101 and accessed by WT 110, stored by WT 110 on behalf of object 101, provided from object 101 to WT 110 periodically or as needed, read from object 101 by WT 110 periodically or as needed, or the like, as well as various combinations thereof. The object data associated with the object 101 may vary for different object types (e.g., heart rate and temperature of a person or animal, sensor readings from a sensor, or the like). The object data associated with object 101 may be intended for delivery to LS 130, intended for delivery to one or more other servers (e.g., location tracking is performed by LS 130 while sensor data from object 101 is provided to a sensor data server, location tracking is performed by LS 130 while health monitoring information for object 101 is provided to a health monitoring data server, or the like), or the like, as well as various combinations thereof. The object 101 also may receive object data intended to be maintained by object 101 (e.g., provided by one or more servers and delivered to the object 101 by the WT 110).

The WT 110 may be any wireless tag which may be used to perform location tracking for object 101. For example, WT 110 may be a Radio Frequency (RF) based tag. For example, WT 110 may be a smart device, an IoT device, an RF Identification (RFID) tag, or the like. For example, WT 110 may be an energy-limited wireless device. The WT 110 may have a user or users associated therewith (e.g., an owner or owners of the WT 110, a person authorized by an owner or operator of the WT 110 to perform management functions for the WT 110 (e.g., location monitoring for WT 110, management of the manner in which location tracking is performed for WT 110, or the like), or the like, as well as various combinations thereof). The WT 110 is configured for at least one of receiving location tracking information (e.g., from WGs 120, from LS 130 via WGs 120, or the like) or transmitting location tracking information (e.g., to WGs 120, to LS 130 via WGs 120, or the like). The types of location tracking information received or transmitted by WT 110 may depend on various factors (e.g., the object type of object 101, a manner in which object 101 is to be tracked, one or more characteristics of the WGs 120 being used to communicate the location tracking information, or the like, as well as various combinations thereof). The types of location tracking information received or transmitted by WT 110 may include information sent by WT 110 and intended for one or more WGs 120, information sent by one or more WGs 120 and intended for WT 110, information sent by WT 110 and intended for LS 130, information sent by LS 130 and intended for WT 110, or the like, as well as various combinations thereof. For example, location tracking information transmitted to WT 110 or from WT 110 may include location tracking messages sent by WT 110 to one or more WGs 120 (e.g., a "keep alive" or "hello" message by which WT 110 indicates to the WG(s) 120 that it is still within their vicinity), location tracking messages sent by one or more WGs 120 to WT 110 (e.g., a "keep alive" or "hello" message by which the WG(s) 120 may indicate to the WT 110 that WT 110 is still within the vicinity of the WG(s) 120), information sent over a communication link between WT 110 and one or more WGs 120, Global Positioning System (GPS) information, wireless signals which may be used for time-of-arrival (ToA) calculations at the WG(s) 120 (e.g., such that the WG(s) 120 may provide the ToA estimates to LS 130 and LS 130 can determine an estimated location of WT 110 based on the known locations of the WG(s) 120 and the ToA estimates received from the WG(s) 120), or the like, as well as various combinations thereof. For example, location tracking information transmitted to WT 110 or from WT 110 may include a tag identifier (TID) of WT 110, a gateway identifier (GID) of a WG 120, timestamp information, or any other suitable types of information which may be used for tracking the location of WT 110. The location tracking information, or portions thereof, may be communicated in a secure manner (e.g., encrypted prior to transmission and decrypted after being received). The communication of location tracking information for tracking the location of WT 110 may be further understood by way of reference to specific examples discussed further below.

The WT 110 includes a set of communication modules 111$_1$-111$_M$ (collectively, communication modules 111). In general, a communication module 111 may be configured for at least one of receiving wireless signals or transmitting wireless signals, where such wireless signals may transport one or more types of information (e.g., object data to be communicated for WT 110, location tracking information to be communicated for WT 110, or the like, as well as various combinations thereof). The communication modules 111 may include one or more modules for communication of wireless signals in different directions (e.g., one or more receivers for receiving downlink signals, one or more transmitters for transmitting uplink signals, one or more transceivers supporting both receive and transmit functions, or the like), one or more modules for communication of wireless signals of different access technology types (e.g., a module for cellular-based communications, a module for WiFi-based communications, a module for Bluetooth-based communications, or the like), one or more modules for communication of wireless signals of different access technology generations (e.g., a module for Third Generation (3G) cellular communications, a module for Fourth Generation (4G) cellular communications, a module for Fifth Generation (5G) cellular communications, or the like), one or more modules for communication of different types of information (e.g., a main transceiver module for reception/transmission of location tracking information and an auxiliary receiver for reception of wake-up signals, a main transceiver module for reception/transmission of object data and location tracking information and an auxiliary receiver for reception of wake-up signals, a main transmitter module for transmission of object data and an auxiliary transceiver module for reception/transmission of location tracking information, or the like), or the like, as well as various combinations thereof. It is noted that, where WT 110 includes a communication module 111 configured to provide an auxiliary receiver function for detection of wake-up signals, WT 110 may be configured to control the operational mode of one or more other communication modules 111 based on detection of wake-up signals by the communication module 111 configured to provide the auxiliary receiver function (e.g., the one or more other communication modules 111 may be configured to switch between a sleep mode in which the communication module(s) 111 is not operable to communicate and an active mode in which the communication module(s) 111 is operable to communicate responsive to detection of a wake-up signal by the communication module 111 configured to provide the auxiliary receiver function). It will be appreciated that, although primarily presented with respect to embodiments in which WT 110 includes a set of communication modules 111, in at least some embodiments WT 110 may include only a single communication module 111. It will be appreciated that, although primarily presented with respect to embodiments in which the functions depicted and described as being supported by the communication modules 111 are arranged in a particular way, the functions depicted and described as being supported by the communication modules 111 may be arranged in various other ways (e.g., using different numbers or arrangements of modules, combining at least some of the modules, using sub-modules, or the like, as well as various combinations thereof).

The WT 110 is configured to support a set of states $115_1$-$115_S$ (collectively, states 115). The WT 110 is expected to operate in one state 115 at a time. The WT 110 may be configured to support transitions between the states 115 under various conditions. It will be appreciated that, although primarily depicted as supporting transitions between certain states 115, WT 110 may be configured to support any suitable transitions between any states 115 (e.g., supporting all possible state transitions, supporting only a subset of the possible state transitions, or the like). The states 115 may be defined in terms of the sets of WGs 120 via which WT 110 may communicate (which may be defined in various ways), the communication protocol(s) via which WT 110 may communicate, the air interface(s) or air interface type(s) via which WT 110 may communicate (e.g., 3G cellular, 4G cellular, 5G cellular, WiFi, Bluetooth, or the like), performance parameters according to which WT 110 may communicate (e.g., transit power, transmit duration, receive power, or the like), or the like, as well as various combinations thereof. The sets of WGs 120 via which WT 110 may communicate in a given state 115 may be defined based on one or more of access device type (e.g., fixed access point versus mobile end user device), access technology type (e.g., cellular, WiFi, Bluetooth, or the like), access technology generation (e.g., 3G cellular, 4G cellular, 5G cellular, or the like), geographic location, or the like as well as various combinations thereof. For example, a first state $115_1$ may support communication via any 3G cellular base station and a second state $115_2$ may support communication via a 4G cellular base station, a first state $115_1$ may support communication via any cellular access point and a second state $115_2$ may support communication via any WiFi access point, a first state $115_1$ may support communication via any cellular access point and a second state $115_2$ may support communication via any suitable end user device (e.g., any end user device that has downloaded an application in order to configured itself to operate in this capacity), a first state $115_1$ may support communication via a particular end user device (e.g., a smartphone or other wireless device of a user associated with WT 110) and a second state $115_2$ may support communication via any cellular access point, a first state $115_1$ may support communication via any access device available at a home location and a second state $115_2$ may support communication via access device located away from the home location, and so forth. It will be appreciated that the sets of WGs 120 via which WT 110 may communicate in a given state 115 may dictate the wireless interface(s) of communication module 111 that is used by WT 110 to communicate location tracking information (e.g., different wireless interfaces of WT 110 may be used for different states 115) and, thus, that the sets of WGs 120 via which WT 110 may communicate in a given state 115 also may be considered to be based on the wireless interface(s) of communication module 111 that is used by WT 110 to communicate location tracking information. The communication protocol(s) via which WT 110 may communicate in a given state 115 may be defined based on the set of WGs 120 associated with the state 115 (e.g., cellular protocols where the set of WGs 120 includes cellular access points, WiFi protocols where the set of WGs 120 includes WiFi access points, and so forth), the core network(s) supporting communications by the set of WGs 120 associated with the state 115 (e.g., Ethernet, Multiprotocol Label Switching (MPLS), or the like, as well as various combinations thereof), one or more characteristics of location tracking information (e.g., type of information, quantity of information, format of information, or the like) to be communicated while in the state 115 (e.g., using Open Device Monitoring and Tracking Protocol (OpenDMTP), Zigbee, or the like), or the like, as well as various combinations thereof. The wireless interface(s) or wireless interface type(s) via which WT 110 may communicate in a given state 115 may be defined based on or dictated by the set of WGs 120 via which WT 110 communicates in the given state 115 and the communication protocol(s) via which WT 110 communicates in the given state 115 as discussed above (e.g., communication via a cellular interface where the set of WGs 120 includes cellular access points, communication via a WiFi interface or a Bluetooth interface where the set of WGs 120 includes one or more end user devices, or the like). The performance parameter(s) according to which WT 110 may communicate in a given state 115 may be defined based on the set of WGs 120 associated with the state 115 (e.g., cellular performance parameters where the set of WGs 120 includes cellular access points, WiFi performance parameters where the set of WGs 120 includes WiFi access points, and so forth), the wireless interface(s) or wireless interface type(s) via which WT 110 communicates in the state 115, the network(s) or type(s) of network(s) supporting communications by the set of WGs 120 associated with the state 115, one or more characteristics of location tracking information (e.g., type of information, quantity of information, format of information, or the like) to be communicated while in the state 115, or the like, as well as various combinations thereof. The various characteristics or parameters according to which WT 110 may communicate in the various states 115 (e.g., wireless interface(s) or wireless interface type(s), communication protocols, performance parameter(s), or the like) may be arranged such that different states 115 may use different air interfaces, different states 115 may use a single air interface (e.g., the different states 115 using the single air interface are differentiated by a combination of different transmission durations or power (e.g., by increasing the duration (for a fixed power) or increasing the power (for a fixed duration), the transmission range can be increased at the cost of higher energy)), or the like, as well as various combinations thereof. The set of states 115 may include a default state and one or more non-default states. The set of states may include a sleep state (e.g., in which WT 110 is not operable to communicate) and one or more active states (e.g., in which WT 110 is operable to communicate). The transitions between states 115, as discussed in additional detail further below, may be based on various conditions, such as one or more of a status of operation of WT 110 in a current state 115 (e.g., availability of the WG(s) 120 of the current state 115, level of performance using the WG(s) 120 of the current state 115, or the like), an expected status of operation of WT 110 in a potential next state 115 (e.g., availability of the WG(s) 120 of the next state 115, level of performance expected when using the WG(s) 120 of the next state 115, or the like), a comparison of a status of operation of WT 110 in a current state 115 and an expected status of operation of WT 110 in a potential next state 115, a temporal condition (e.g., responsive to expiration of a timer, at a particular time, based on a schedule, based on a duty cycle (e.g., operating in a first state 115 for 90% of the time and a second state 115 for 10% of the time), or the like), a status of the WT 110 (e.g., a battery status of WT 110, a status of an accelerometer of WT 110, or the like), or the like, as well as various combinations thereof. The conditions for transitions between states 115 may be adjusted based on the current status of WT 110 (e.g., adjusting a time schedule or duty cycle for transitions between states 115 based on a battery status of WT 110, adjusting one or more conditions based on one or more previous transitions between states 115 at WT 110, or the like, as well as various combinations thereof. The states 115 or associated transitions between states 115 may be configured based on various goals (e.g., maximizing a probability of accurately tracking the location of object 101 at the expense of the battery charge of WT 110, minimizing battery usage of WT 110 at the expense of potentially inaccurate or partial tracking of object 101, various ways of balancing accuracy of tracking object 101 and the battery charge of WT 110, or the like, as well as various combinations thereof). The states 115 may include an unconnected state in which WT 110 is configured to transmit a wireless beacon signal which may be detected by various WGs 120 and a connected state in which WT 110 is configured to communicate via one or more connections with one or more WGs 120, and transitions of WT 110 between the unconnected state and the connected state may be controlled based on wireless gateway association rules associated with WT 110 as discussed further below. The states 115 may have various other characteristics associated therewith (e.g., in terms of one or more of the manner in which WT 110 operates while in states 115, the manner in which WT 110 transitions between states 115, or the like, as well as various combinations thereof). The set of states 115 supported by WT 110 (e.g., the manner in which WT 110 operates in states 115, the manner in which WT 110 transitions between states 115, or the like, as well as various combinations thereof) may be defined in other ways.

The WT 110, as discussed above, is configured to operate in an unconnected state in which location tracking information for the WT 110 is transmitted using wireless beacon signals from the WT 110 (e.g., the wireless beacon signals themselves are the location tracking information, the wireless beacon signals have encoded therein location tracking information, or the like, as well as various combinations thereof) and the connected state in which location tracking information for the WT 110 is communicated using one or more connections with one or more WGs 120. The communication of location tracking information via wireless beacon signals in the unconnected state may include transmission of wireless beacon signals by WT 110, transmission of wireless beacon signals by a WG(s) 120, or the like, as well as various combinations thereof. The connection established between WT 110 and a WG 120 may be any suitable type of radio connection, may be based on any suitable type of communication protocols, or the like, as well as various combinations thereof. For example, the connection established between WT 110 and a WG 120 may be based on cellular, WiFi (e.g., WiFi peer-to-peer protocol), Bluetooth, or the like. The communication of location tracking information via an established connection between the WT 110 and a WG 120 in the connected state may be performed periodically, responsive to a condition (e.g., a status change associated with object 110, a status change associated with WT 110, detection of a request for location information from the WG 120, or the like), based on one or more protocols, or the like, as well as various combinations thereof. It will be appreciated that, while there may be additional overhead associated with establishment of the connection between WT 110 and WG 120 (e.g., to negotiate communication parameters for the connection (e.g., capabilities of WT 110, capabilities of WG 120, or the like), for authentication, or the like, as well as various combinations thereof), the connection between the WT 110 and WG 120 may configured to enable more energy-efficient communication of location tracking information between the WT 110 and WG 120 (e.g., as compared to the unconnected state). For example, a heartbeat protocol may be used over the connection between the WT 110 and WG 120 for communication of location tracking information between the WT 110 and WG 120 (e.g., via periodic transmission of control (heartbeat) messages via the connection in order to verify the connection between the WT 110 and WG 120) and the connection between WT 110 and WG 120 may be controlled based on the status of the control (heartbeat) messages exchanged via the connection (e.g., the connection may be terminated based on a determination that a control (heartbeat) message has not been received via the connection for a threshold length of time, the connection may be terminated based on a determination that the signal strength of a signal transporting a control (heartbeat) message is below a threshold, or the like). As noted above, the use of a heartbeat protocol or other similar connection-based communication of location tracking information for WT 110 may require a relatively low data rate such that the connected state of WT 110 may be highly energy efficient. The WT 110 is configured to transition from the unconnected state to the connected state (e.g., based on an indication that a connection has been established between the WT 110 and the WG 120), from the connected state to the unconnected state (e.g., based on an indication that a connection between the WT 110 and the WG 120 has terminated or is no longer of sufficient quality), or the like.

The WGs 120 may include any wireless gateways which may support use of WT 110 to perform location tracking for object 101. The WGs 120 may be configured to support communication of location tracking information for WT 110. The location tracking information for WT 110 that is communicated by WGs 120 may include location tracking information received from WT 110 and intended for propagation to LS 130, location tracking information received from LS 130 and intended for propagation to WT 110, location tracking information generated by WGs 120 based on one or more conditions (e.g., based on location tracking information received from WT 110, lack of receipt of location tracking information from WT 110 when such location tracking information is expected, the existence of a communication link between WT 110 and the WG 120, the loss or absence of a communication link between WT 110 and the WG 120, the quality of a communication link between WT 110 and the WG 120, or the like) where the generated location tracking information may be forwarded by the WG 120 to WT 110 or LS 130, or the like, as well as various combinations thereof. The WGs 120 may be configured to receive location tracking information from WT 110 and perform one or more of appending WG-determined location tracking information to the received location tracking information and forwarding the combined location tracking information to LS 130, generating WG-determined location tracking information based on receipt of the location tracking information from WT 110 and forwarding only the WG-determined location tracking information to LS 130, determining the location of the WT 110 based on the location tracking information and providing to LS 130 an indication that the WT 110 is within the vicinity of WG 120, or the like, as well as various combinations thereof. The WG-determined location tracking information provided from a WG 120 to LS 130 may include a GID of the WG 120 (e.g., where LS 130 could look up the location of the WG 120 based on the GID of the WG 120 if the WG 120 is a fixed WG or a mobile WG for which LS 130 has access to its location tracking information), a location of the WG 120 where the WG 120 is a fixed WG or a mobile WG (e.g., determined by the WG 120 using one or more of GPS techniques, RFID fingerprinting, an OS-specific location service, or the like), an indication that WT 110 is within the vicinity of the WG 120, timestamp information, or the like, as well as various combinations thereof. The types of location tracking information that may be communicated by WGs 120 (e.g., received from WT 110 and forwarded by WGs 120, generated by WGs 120, or the like, as well as various combinations thereof) may be further understood by way of reference to specific examples discussed further below. The WGs 120 may be configured to control or facilitate transitions of WT 110 between states 115. The WGs 120 may be configured to perform various other functions. For example, WGs 120 may include cellular access points (e.g., base stations, picocells, femtocells, or the like), WiFi access points, end user devices (e.g., smartphones, tablet computers, laptop computers, or the like) configured to operate as relays between WT 110 and wireless access points (e.g., cellular access points, WiFi access points, or the like), or the like, as well as various combinations thereof. It will be appreciated that communication between WGs 120 and WT 110 is expected to be wireless (although it will be appreciated that some objects may be associated with tags which may also or alternatively support wired communications). It also will be appreciated that communication between WGs 120 and LS 130 may include wired communications and/or wireless communications, which may depend on the type of device used as the WG 120 (e.g., for a WG 120 that is a fixed wireless access point, communications with LS 130 may be wired (e.g., using Ethernet networks, cable networks, fiber-optic networks, or the like); whereas for a WG 120 that is a mobile wireless access device, such as a smartphone or other end user terminal, communications from the mobile wireless access device to a fixed wireless access point may be wireless (e.g., using cellular communications (e.g., 3G cellular, 4G cellular, 5G cellular, or the like), WiFi communications, or the like) while communications from the fixed wireless access point to the LS 130 may be wired (e.g., using Ethernet networks, cable networks, fiber-optic networks, or the like)).

The LS 130 is configured to support location tracking for WT 110 (as well as various other WTs, which are omitted for purposes of clarity). It is noted that LS 130 may or may not be aware of the associated object 101 for which the WT 110 is used to perform location tracking (or other objects for which other WTs may be used to perform location tracking which, again, are omitted for purposes of clarity). The LS 130 may maintain location tracking information for WT 110 (as well as various other WTs, which are omitted for purposes of clarity), which is depicted as location tracking information 131 associated with LS 130. The location tracking information 131 maintained by LS 130 may include, for each WT for which LS 130 performs location tracking (again, WT 110 as well as various other WTs which are omitted for purposes of clarity), an estimated location of the WT. The location tracking information 131 maintained by LS 130 may include, for each WT for which LS 130 performs location tracking, a time at which the estimated location of the WT was last determined or other suitable types of location tracking information. The LS 130 may be configured to use location tracking information 131 to support various location-based services, to provide location tracking information 131 to other servers for use by the other servers to support various location-based services, or the like, as well as various combinations thereof.

The LS 130 may be configured to support processing of location tracking information for WT 110. The location tracking information for WT 110 that is processed by LS 130 may include location tracking information received from WT 110 via WGs 120, location tracking information received from WGs 120 (e.g., generated at WGs 120 based on interaction by WGs 120 with WT 110), or the like, as well as various combinations thereof. The types of location tracking information that may be processed by LS 130 may be further understood by way of reference to specific examples discussed further below. The LS 130 may be configured to control or facilitate transitions of WT 110 between states 115.

The wireless communication system 100 is configured to support localization of WT 110 based on wireless gateway association information represented herein as a set of wireless gateway association rules (WGARs) 140 associated with WT 110. The WGARs 140 may be used to control transitions of WT 110 between the unconnected state in which WT 110 communicates location tracking information using a wireless beacon signal which may be detected by various WGs 120 and the connected state in which WT 110 communicates location tracking information via one or more connections with one or more WGs 120. The WGARs 140 may be used to control notifications related to location tracking of WT 110. The WGARs 140 may be used for various other purposes related to location tracking of WT 110 as discussed further below.

The WGARs 140 may include various rules related to association of WT 110 with WGs 120 and the manner in which association of WT 110 with WGs 120 is to be handled (e.g., in terms of the manner in which WT 110 communicates location tracking information (e.g., using a wireless beacon signal in an unconnected state, via one or more connections with one or more WGs 120 in a connected state, or the like), triggering of alerts (e.g., an alert to a user of WT 110 that WT 110 is in a location where it should not be, an alert to a user of WT 110 that WT 110 has not entered a location that it should have entered, or the like), or the like, as well as various combinations thereof).

The WGARs 140 may include various rules defining one or more sets of WGs 120 with which WT 110 must be or may be associated (e.g., using one or more wireless gateway whitelists (WGWs) or other suitable rules indicative of one or more sets of WGs 120 with which WT 110 must be or may be associated), one or more sets of WGs 120 with which WT 110 should not or cannot be associated (e.g., using one or more wireless gateway blacklists (WGBs) or other suitable rules indicative of one or more sets of WGs 120 with which WT 110 should not or cannot be associated), or the like, as well as various combinations thereof.

The WGARs 140, as noted above, may include one or more WGWs, where a WGW includes a list of one or more of the WGs 120 trusted by the user of the WT 110 (e.g., trusted by the user of the WT 110 for tracking of object 101 associated with WT 110). The WGAR(s) 140 for a WGW may indicate that the WT 110 is to remain in the connected state as long as the WT 110 is connected to a threshold number of WGs 120 listed in the WGW (e.g., at least one of the WGs 120 listed in the WGW, at least two of the WGs 120 listed in the WGW, all of the WGs 120 listed in the WGW, or the like) and is to transition from the connected state to the unconnected state when the WT 110 is no longer connected to the threshold number of WGs 120. For example, where the WT 110 is used by parents to track the location of their child while the child is in the care of a babysitter, the parents may define a WGW for WT 110 that includes a WiFi access point at their home, the smartphone of the babysitter, and a WiFi access point at the school attended by the child, and the WGAR(s) 140 for the WGW may indicate that the WT 110 is to remain in the connected state as long as the WT 110 is connected to at least one of the WGs 120 in the WGW. For example, where the WT 110 is used by a business to track a vehicle used by an employee, a representative of the business may define a geographic area within which the vehicle may be used and a network entity (e.g., LS 130 or other appropriate entity) may translate the geographic area into a WGW including various WGs 120 located within the geographic area, and the WGAR(s) 140 for the WGW may indicate that the WT 110 is to remain in the connected state as long as the WT 110 is connected to at least one of the WGs 120 in the WGW. It will be appreciated that WGWs may be defined in various other ways (e.g., using fewer or more WGs 120, using more complicated groups or arrangements of WGs 120, or the like), specified in various other ways, provided for various other purposes, or the like, as well as various combinations thereof. It will be appreciated that, although primarily depicted and described as being "lists" (e.g., which may include lists of identifiers of WGs 120), the information of WGWs may be represented in other ways (e.g., using rule statements that identify WG(s) 120 considered to be whitelisted or the like).

The WGARs 140, as noted above, may include one or more WGBs, where a WGB includes a list of one or more of the WGs 120 not trusted by the user of the WT 110 (e.g., not trusted by the user of the WT 110 for tracking of object 101 associated with WT 110, deemed by the user of the WT 110 to be associated with undesirable or unsafe conditions, or the like). The WGAR(s) 140 for a WGB may indicate that the WT 110 is to remain in the unconnected state even when the WT 110 could otherwise transition to the connected state based on association of the WT 110 with one or more WGs 120 on a WGW of the WT 110, that the user of WT 110 is to be notified based on association of the WT 110 with any of the WGs 120 in the WGB, or the like, as well as various combinations thereof. For example, where the WT 110 is used by a parent of a child to track the location of the child while the child is in the care of a babysitter, the parent may define a WGB for WT 110 that includes a smartphone of a boyfriend of the babysitter and a cellular access point near the home of the boyfriend of the babysitter, and the WGAR(s) 140 for the WGB may indicate that the WT 110 is to remain in the unconnected state as long as the WT 110 is within range of at least one of the WGs 120 in the WGB and that the user of WT 110 is to be notified that the WT 110 is within range of at least one of the WGs 120 in the WGB. For example, where the WT 110 is used by a business to track a vehicle used by an employee, a representative of the business may define a WGB for WT 110 that includes a cellular access point near the home of the employee (e.g., to ensure that the employee is not stopping home during the workday), and the WGAR(s) 140 for the WGB may indicate that the WT 110 is to remain in the unconnected state as long as the WT 110 is within range of the cellular access point in the WGB and that the user of WT 110 is to be notified that the WT 110 is within range of the cellular access point in the WGB. It will be appreciated that WGBs may be defined in various other ways (e.g., using fewer or more WGs 120, using more complicated groups or arrangements of WGs 120, or the like), specified in various other ways, provided for various other purposes, or the like, as well as various combinations thereof. It will be appreciated that, although primarily depicted and described as being "lists" (e.g., which may include lists of identifiers of WGs 120), the information of WGBs may be represented in other ways (e.g., using rule statements that identify WG(s) 120 considered to be blacklisted or the like).

The WGARs 140 may be defined based on various other types of information, such as temporal information (e.g., WT 110 should be associated with a particular WG 120 or combination of WGs 120 on a particular day of the week or at a particular time of day, WT 110 should not be associated with a particular WG 120 or combination of WGs 120 on a particular day of the week or at a particular time of day, or the like) or other suitable types of information.

The WGARs 140, as discussed further below, may be used to control transitions of WT 110 between the unconnected state supported by WT 110 in which location tracking information for the WT 110 is transmitted using wireless beacon signals (e.g., the wireless beacon signals themselves are the location tracking information, the wireless beacon signals have encoded therein location tracking information, or the like) and the connected state supported by WT 110 in which location tracking information for the WT 110 is communicated using one or more connections with one or more WGs 120.

The WGARs 140 may be used to control notifications related to localization of WT 110. The WGARs 140 may be used to initiate a notification to the user when a WG 120 receives a wireless beacon signal from the WT 110 while the WT 110 is in the connected state. The WGARs 140 may be used to initiate a notification to the user of WT 110 based on a determination that the WT has transitioned from the unconnected state to the connected state. For example, where the WT 110 is tracking a child, a notification of the transition of the WT 110 from the unconnected state to the connected state may be an indication that the child has arrived at daycare on time (e.g., where a WiFi access point of the day care center is on a WGW of the WT 110 for the child). The WGARs 140 may be used to initiate a notification to the user of WT 110 based on a determination that the WT has transitioned from the connected state to the unconnected state. For example, where the WT 110 is tracking a child, a notification of the transition of the WT 110 from the connected state to the unconnected state may be an indication that the child has moved to an unsecure location or outside of a geographic area approved by the parents of the child, such that the parents should be notified. The LS 130 may be configured to initiate a notification to the user of WT 110 responsive to various other conditions. The notifications may include various types and granularities of information (e.g., an indication as to whether the WT 110 has transitioned from the unconnected state to the connected state or from the connected state to the unconnected state, an indication of the WG(s) with which WT 110 has established connectivity, an indication of the WG(s) with which WT 110 has lost connectivity, timestamp information, or the like, as well as various combinations thereof). The notifications may be in the form of one or more of a text message to a smartphone or other smart device of the user, an email to an email account of the user, a phone call to the user, or the like, as well as various combinations thereof. It will be appreciated that, although primarily presented with respect to embodiments in which notification rules form part of the WGARs 140, the notification rules may be handled separately from the WGARs 140. It will be appreciated that such notification capabilities also or alternatively may be provided by one or more other network elements.

The WGARs 140 may include various other rules related to association of WT 110 with WGs 120 and the manner in which association of WT 110 with WGs 120 is to be handled (e.g., for handling of whitelists or backlists, in terms of the manner in which WT 110 communicates location tracking information, handling of notifications to the user of WT 110, or the like, as well as various combinations thereof).

The WGARs 140 may be maintained by or available to LS 130 (illustratively, WGARs 140$_S$). The use of WGARs 140$_S$ by LS 130 to control localization of WT 110 is described further below.

The WGARs 140 (or portions thereof) may be maintained by or available to WGs 120 (illustratively, WGARs 140$_{G1}$-140$_{GG}$, which may be referred to collectively as WGARs 140$_G$). The WGARs 140 (or portions thereof) may be provided to WGs 120 by LS 130, via access by the user of WT 110 to configure the WGARs 140 on the WGs 120, or the like, as well as various combinations thereof. The WGARs 140 may be provided to a given WG 120 in the form of a list of WTs (e.g., WT 110 and any other WTs) for which the given WG 120 is an authorized wireless gateway (namely, a whitelist wireless gateway), may be provided to a given WG 120 in the form of a list of WTs (e.g., WT 110 and any other WTs) for which the given WG 120 is an unauthorized wireless gateway (namely, a whitelist wireless gateway), or the like, as well as various combinations thereof. The use of WGARs 140$_{Gi}$ by respective WGs 120$_i$ to control localization of WT 110 is described further below.

The WGARs 140 (or portions thereof) may be maintained by or available to WT 110 (illustratively, WGARs 140$_T$). The WGARs 140 (or portions thereof) may be provided to WT 110 by LS 130 via WGs 120, via access by the user of WT 110 to configure the WGARs 140 on the WT 110, or the like, as well as various combinations thereof. The WGARs 140 may be provided to WT 110 in the form of one or more WGWs, one or more wireless gateway blacklists, or the like, as well as various combinations thereof. The use of WGARs 140$_T$ by WT 110 to control localization of WT 110 is described further below.

The WGARs 140 (or portions thereof) for WT 110 may be created and managed by the user of the WT 110 (e.g., specifically defined by the user of the WT 110, defined automatically for the user based on information provided by the user of the WT 110, or the like, as well as various combinations thereof). The user of WT 110 may use a web-based interface to select or submit a set of WGs 120 to be used as a WGW for WT 110. The user of WT 110 may use a web-based interface to select or submit a set of WGs 120 to be used as a WGB for WT 110. The user of WT 110 may use a web-based interface to select or submit a geographic area that is to be used as a whitelist area (e.g., each WG 120 within the geographic area is added to a WGW for the WT 110) or a blacklist area (e.g., each WG 120 within the geographic area is added to a wireless gateway blacklist for the WT 110), and a network element receiving the geographic area submitted by the user of WT 110 (e.g., LS 130 or any other suitable device) may identify WGs 120 located within the geographic area and create the associated whitelist or blacklist on behalf of the user of the WT 110 by adding the identified WGs 120 to the associated whitelist or blacklist to be associated with the WT 110. The geographic area may be specified by the user of WT 110 by selecting a region of a map corresponding to the geographic area, specifying GPS coordinates defining the geographic area, or the like, as well as various combinations thereof. The user of WT 110 may use a web-based interface to define one or more notification rules which may be used to provide notifications (e.g., to the user, to other individuals, to network elements or end user device, of the like) under various conditions related to the WT 110. The user of WT 110 may use a web-based interface to select or submit various other types of information which may be used to create the WGARs 140 for WT 110. The user may use one or more user terminals (e.g., home computer, work computer, smartphone, tablet, or the like) to access the web-based interface for configuration of the WGARs 140 for WT 110 (illustratively, user terminal 150 which is depicted as having a network connection 151 to LS 130, although it will be appreciated that configuration of WGARs 140 may be supported by one or more other network elements which may then provide the WGARs 140 to the LS 130).

The WGARs 140 (or portions thereof) for WT 110 may be created, updated, or otherwise managed automatically. The WGARs 140 (or portions thereof) for WT 110 may be created or updated automatically based on location tracking information associated with the WT 110. The WGARs 140 (or portions thereof) for WT 110 may be created or updated automatically based on a machine learning capability. For example, a WGW for WT 110 may be adaptively updated to include one or more WGs 120 of a particular area based on a determination that the WT 110 is often in that area (e.g., greater than a threshold amount of time per day, greater than a threshold number of days per week, or the like). For example, a WGW for WT 110 may be adaptively updated to remove one or more WGs 120 of a particular area based on a determination that the WT 110 is infrequently or never in that area (e.g., less than a threshold amount of time per day, less than a threshold number of days per month, or the like). The WGARs 140 (or portions thereof) for WT 110 may be created or updated automatically by LS 130 or any other suitable element. The user associated with WT 110 may be notified of the automatic updates to the WGARs 140 for WT 110. It will be appreciated that, although primarily described with respect to embodiments in which updates to the WGARs 140 for WT 110 are applied automatically, in at least some embodiments the updates to the WGARs 140 for WT 110 may be determined automatically, but the user associated with the WT 110 may be notified of the determined updates before the updates are applied for use (so that the user has the capability to specifically approve or reject the determined updates before the determined updates go into effect). The WGARs 140, as noted above, are used to control transitions of WT 110 between the unconnected state and the connected state to thereby control localization of WT 110. The use of WGARs 140 to control transitions of WT 110 between the unconnected state and the connected state, to thereby control localization of WT 110, may be performed in various ways as discussed further below.

In at least some embodiments, control over localization of WT 110 may be performed using WGARs 140 for WT 110 that are maintained in LS 130. The WGARs 140 for WT 110 may have been configured onto LS 130 by a user of WT 110 via a web-based interface to LS 130 or to some other configuration system which then provides the WGARs 140 for WT 110 to LS 130. For purposes of clarity in describing such embodiments, it is assumed that the WGARs 140 for WT 110 are a simple set of rules for a WGW including a single WG 120 (namely, WG 120$_2$). The WT 110 begins in the unconnected state and, thus, periodically transmits a wireless beacon signal which may be detected by any WG 120 within wireless range of WT 110. The wireless beacon signal is configured to enable location tracking for WT 110 and, thus, for associated object 101. The wireless beacon signal is configured such that a WG 120 that receives the wireless beacon signal can identify the WT 110 (e.g., the wireless beacon signal includes a TID of the WT 110, the wireless beacon signal has signal characteristics unique to the WT 110 and which may be analyzed to identify the WT 110, or the like, as well as various combinations thereof). The wireless beacon signal optionally may include one or more of additional location tracking information (e.g., a timestamp, a GID of a WG 120 for which the wireless beacon signal is intended, or the like), tag data of the WT 110, or the like. In describing such embodiments, assume that WT 110 transmits the wireless beacon signal and that the wireless beacon signal is detected by WG 120$_1$ (which is not on the WGW for WT 110). The WG 120$_1$ needs to determine whether it is on a WGW for the WT 110 from which the wireless beacon signal was received. The WG 120$_1$ may identify the WT 110 from the wireless beacon signal and send a message to LS 130 to request that LS 130 inform the WG 120$_1$ as to whether it is on a WGW for the WT 110 or the WG 120$_1$ may send information associated with the wireless beacon signal to LS 130 such that LS 130 may identify the WT 110 from the information associated with the wireless beacon signal and may then inform WG 120$_1$ whether it is on a WGW for the WT 110 from which the wireless beacon signal was received. In either case, the identity of the WT 110 is determined and the LS 130 determines, based on the identity of the WT 110 and WGARs 140 for WT 110, whether WG 120$_1$ is on a WGW for the WT 110. As noted above, WG 120$_1$ is not on a WGW for the WT 110 from which the wireless beacon signal was received and, thus, LS 130 determines this and responds to WG 120$_1$ with a message indicative that WG 120$_1$ is not on a WGW for the WT 110 from which the wireless beacon signal was received. The WG 120$_1$ receives the message indicative that WG 120$_1$ is not on a WGW for the WT 110 from which the wireless beacon signal was received and, thus, WG 120$_1$ does not initiate establishment of a connection with WT 110. The LS 130, based on a determination that WG 120$_1$ received the wireless beacon signal from WT 110, may determine whether WGARs 140 for WT 110 (or other associated alert rules) include a rule indicative that the user of WT 110 is to be informed that WG 120$_1$ received the wireless beacon signal from WT 110 (e.g., the user of WT 110 is to be informed of locations of WT 110 when WT 110 is not in the connected state, WG 120$_1$ is on an associated blacklist for WT 110, or the like) and, based on a determination that WGARs 140 for WT 110 include a rule indicative that the user of WT 110 is to be informed that WG 120$_1$ received the wireless beacon signal from WT 110, initiates a notification to the user of WT 110. In describing such embodiments, further assume that WT 110 transmits the wireless beacon signal and that the wireless beacon signal is detected by WG 120$_2$ (which is on the WGW for WT 110). The WG 120$_2$, like WG 120$_1$ as discussed above, needs to determine whether it is on a WGW for the WT 110 from which the wireless beacon signal was received. The WG 120$_2$ may identify the WT 110 from the wireless beacon signal and send a message to LS 130 to request that LS 130 inform the WG 120$_2$ as to whether it is on a WGW for the WT 110 or the WG 120$_2$ may send information associated with the wireless beacon signal to LS 130 such that LS 130 may identify the WT 110 from the information associated with the wireless beacon signal and may then inform WG 120$_2$ whether it is on a WGW for the WT 110 from which the wireless beacon signal was received. In either case, the identity of the WT 110 is determined and the LS 130 determines, based on the identity of the WT 110 and WGARs 140 for WT 110, whether WG 120$_2$ is on a WGW for the WT 110. As noted above, WG 120$_2$ is on a WGW for the WT 110 from which the wireless beacon signal was received and, thus, LS 130 determines this and responds to WG 120$_2$ with a message indicative that WG 120$_2$ is on a WGW for the WT 110 from which the wireless beacon signal was received. The WG 120$_2$ receives the message indicative that WG 120$_2$ is on a WGW for the WT 110 from which the wireless beacon signal was received and, thus, WG 120$_2$ initiates establishment of a connection with WT 110. The WG 120$_2$ may initiate establishment of a connection with WT 110 by sending a connection establishment request to WT 110, sending a message to WT 110 indicating that WT 110 should send a connection establishment request to WT 110, or the like. The initiation of establishment of the connection with WG 120$_2$ or the completion of establishment of the connection with WG 120$_2$ causes WT 110 to transition from the unconnected state (in which WT 110 transmits the wireless beacon signal) to the connected state (in which WT 110 no longer transmits the wireless beacon signal and, instead, communicates via the connection with WG 120₂). The information communicated by the WT 110 in the connected state, as discussed above, may include location tracking information (e.g., one or more of a TID of WT 110, timestamp information, or the like), tag data, or the like, as well as various combinations thereof. The LS 130, based on a determination that WT 110 has entered the connected state (e.g., based on an assumption that WT 110 will enter the connected state when LS 130 determines that the WG 120₂ is on a WGW for the WT 110 from which the wireless beacon signal was received, based upon receipt from WG 120₂ of an indication of initiation of or establishment of the connection between WT 110 and WG 120₂, or the like) may determine whether WGARs 140 for WT 110 (or other associated alert rules) include a rule indicative that the user of WT 110 is to be informed when WT 110 transitions from the unconnected state to the connected state and, based on a determination that the user of WT 110 is to be informed when WT 110 transitions from the unconnected state to the connected state, initiates a notification to the user of WT 110. The WT 110 may remain in the connected state until the connection with WG 120₂ is lost, or until some other trigger condition causes WT 110 to transition from the connected state back to the unconnected state (e.g., a quality level of the connection drops below a threshold, an SNR level of wireless signals of WT 110 drops below a threshold, a trigger condition based on temporal conditions, or the like, as well as various combinations thereof). In describing such embodiments, further assume that the connection between WT 110 and WG 120₂ is lost (e.g., WT 110 moves out of wireless range of WG 120₂, WG 120₂ moves out of wireless range of WT 110, or the like) and that WT 110 detects the loss of the connection between WT 110 and WG 120₂. The WT 110, based on detection of the loss of the connection between WT 110 and WG 120₂, transitions from the connected state back to the unconnected state in which the WT 110 again transmits the wireless beacon signal which may be detected by any of the WGs 120. The WG 120₂ also may detect the loss of the connection between WT 110 and WG 120₂ and may inform LS 130 of the loss of the connection between WT 110 and WG 120₂. The LS 130, based on receipt from WG 120₂ of an indication of the loss of the connection between WT 110 and WG 120₂, may determine whether WGARs 140 for WT 110 (or other associated alert rules) include a rule indicative that the user of WT 110 is to be informed when WT 110 transitions from the connected state to the unconnected state and, based on a determination that the user of WT 110 is to be informed when WT 110 transitions from the connected state to the unconnected state, initiates a notification to the user of WT 110. The use of WGARs 140 for WT 110 that are maintained in LS 130 for control over localization of WT 110 may be performed using various other functions or features as discussed further herein. It will be appreciated that such embodiments may be further understood by way of reference to FIG. 2 (depicting and describing at least some functions which may be supported by LS 130 for at least some such embodiments), FIG. 3 (depicting and describing at least some functions which may be supported by a WG 120 for at least some such embodiments), and FIG. 4 (depicting and describing at least some functions which may be supported by WT 110 for at least some such embodiments).

In at least some embodiments, control over localization of WT 110 may be performed using WGARs 140 for WT 110 that are maintained in one or more of the WGs 120 (e.g., one(s) of the WGs 120 for which WGARs 140 for WT 110 are specified). As discussed above, The WGARs 140 for WT 110 may have been configured onto WGs 120 in various ways (e.g., configured onto LS 130 by a user of WT 110 via a web-based interface to LS 130 and transferred from LS 130 onto ones of the WGs 120 for which WGARs 140 for WT 110 are specified, configured onto one or more WGs 120 by a user of WT 110 directly via a web-based interface to the one or more WGs 120, or the like, as well as various combinations thereof). For purposes of clarity in describing such embodiments, it is assumed that the WGARs 140 for WT 110 are a simple set of rules for a WGW including a single WG 120 (namely, WG 120₂). The WT 110 begins in the unconnected state and, thus, periodically transmits a wireless beacon signal which may be detected by any WG 120 within wireless range of WT 110. The wireless beacon signal is configured to enable location tracking for WT 110 and, thus, for associated object 101. The wireless beacon signal is configured such that a WG 120 that receives the wireless beacon signal can identify the WT 110 (e.g., the wireless beacon signal includes a TID of the WT 110, the wireless beacon signal has signal characteristics unique to the WT 110 and which may be analyzed to identify the WT 110, or the like, as well as various combinations thereof). The wireless beacon signal optionally may include one or more of additional location tracking information (e.g., a timestamp, a GID of a WG 120 for which the wireless beacon signal is intended, or the like), tag data of the WT 110, or the like. In describing such embodiments, assume that WT 110 transmits the wireless beacon signal and that the wireless beacon signal is detected by WG 120₁ (which is not on the WGW for WT 110). The WG 120₁ needs to determine whether it is a whitelist wireless gateway for the WT 110 from which the wireless beacon signal was received (e.g., on a WGW specified as part of the WGAR 140 for WT 110). The WG 120₁ determines the identity of WT 110 from the wireless beacon signal and performs a lookup on the basis of the identity of WT 110 (without having to contact LS 130) to determine whether WG 120₁ is a whitelist wireless gateway for WT 110. As noted above, WG 120₁ is not a whitelist wireless gateway for the WT 110 from which the wireless beacon signal was received and, thus, WG 120₁ does not initiate establishment of a connection with WT 110. Additionally, while WG 120₁ does not initiate establishment of a connection with WT 110, there may be a determination (e.g., by WG 120₁, by LS 130 responsive to a request from WG 120₁, or the like) as to whether WGARs 140 for WT 110 (or other associated alert rules) include a rule indicative that the user of WT 110 is to be informed that WG 120₁ received the wireless beacon signal from WT 110 (e.g., the user of WT 110 is to be informed of locations of WT 110 when WT 110 is not in the connected state, WG 120₁ is on an associated blacklist for WT 110, or the like) and, based on a determination that WGARs 140 for WT 110 (or other associated alert rules) include a rule indicative that the user of WT 110 is to be informed that WG 120₁ received the wireless beacon signal from WT 110, a notification to the user of WT 110 is initiated (e.g., by WG 120₁ (e.g., via a message to LS 130) where the determination is made by WG 120₁, by LS 130 where the determination is made by LS 130, or the like). In describing such embodiments, further assume that WT 110 transmits the wireless beacon signal and that the wireless beacon signal is detected by WG 120₂ (which is on the WGW for WT 110). The WG 120₂, like WG 120₁ as discussed above, needs to determine whether it is a whitelist wireless gateway for the WT 110 from which the wireless beacon signal was received (e.g., on a WGW specified as part of the WGAR 140 for WT 110). The WG 120₂ determines the identity of WT 110 from the wireless beacon signal and performs a lookup on the basis of the identity of WT 110 (without having to contact LS 130) to determine whether WG 120$_2$ is a whitelist wireless gateway for WT 110. As noted above, WG 120$_2$ is a whitelist wireless gateway for the WT 110 from which the wireless beacon signal was received and, thus, WG 120$_2$ initiates establishment of a connection with WT 110. The WG 120$_2$ may initiate establishment of a connection with WT 110 by sending a connection establishment request to WT 110, sending a message to WT 110 indicating that WT 110 should send a connection establishment request to WT 110, or the like. The initiation of establishment of the connection with WG 120$_2$ or the completion of establishment of the connection with WG 120$_2$ causes WT 110 to transition from the unconnected state (in which WT 110 transmits the wireless beacon signal) to the connected state (in which WT 110 no longer transmits the wireless beacon signal and, instead, communicates via the connection with WG 120$_2$). The information communicated by the WT 110 in the connected state, as discussed above, may include location tracking information (e.g., one or more of a TID of WT 110, timestamp information, or the like), tag data, or the like, as well as various combinations thereof. Additionally, based on a determination that WT 110 has entered the connected state (e.g., based on an assumption that WT 110 will enter the connected state when WG 120$_2$ determines that it is a whitelist wireless gateway for the WT 110 from which the wireless beacon signal was received, based upon detection by WG 120$_2$ that the connection between WT 110 and WG 120$_2$ has been successfully established, or the like), there may be a determination (e.g., by WG 120$_2$, by LS 130 responsive to a request from WG 120$_2$, or the like) as to whether WGARs 140 for WT 110 (or other associated alert rules) include a rule indicative that the user of WT 110 is to be informed when WT 110 transitions from the unconnected state to the connected state and, based on a determination that the user of WT 110 is to be informed when WT 110 transitions from the unconnected state to the connected state, a notification to the user of WT 110 is initiated (e.g., by WG 120$_2$ (e.g., via a message to LS 130) where the determination is made by WG 120$_2$, by LS 130 where the determination is made by LS 130, or the like). The WT 110 may remain in the connected state until the connection with WG 120$_2$ is lost, or until some other trigger condition causes WT 110 to transition from the connected state back to the unconnected state (e.g., a quality level of the connection drops below a threshold, an SNR level of wireless signals of WT 110 drops below a threshold, a trigger condition based on temporal conditions, or the like, as well as various combinations thereof). In describing such embodiments, further assume that the connection between WT 110 and WG 120$_2$ is lost (e.g., WT 110 moves out of wireless range of WG 120$_2$, WG 120$_2$ moves out of wireless range of WT 110, or the like) and that WT 110 detects the loss of the connection between WT 110 and WG 120$_2$. The WT 110, based on detection of the loss of the connection between WT 110 and WG 120$_2$, transitions from the connected state back to the unconnected state in which the WT 110 again transmits the wireless beacon signal which may be detected by any of the WGs 120. The WG 120$_2$ also may detect the loss of the connection between WT 110 and WG 120$_2$ and may initiate a process for determining whether the user of WT 110 is to be informed of the transition of WT 110 from the connected state to the unconnected state. Namely, based on a determination that WT 110 has entered the unconnected state, there may be a determination (e.g., by WG 120$_2$, by LS 130 responsive to a request from WG 120$_2$, or the like) as to whether WGARs 140 for WT 110 (or other associated alert rules) include a rule indicative that the user of WT 110 is to be informed when WT 110 transitions from the connected state to the unconnected state and, based on a determination that the user of WT 110 is to be informed when WT 110 transitions from the connected state to the connected state, a notification to the user of WT 110 is initiated (e.g., by WG 120$_1$ (e.g., via a message to LS 130) where the determination is made by WG 120$_1$, by LS 130 where the determination is made by LS 130, or the like). The use of WGARs 140 for WT 110 that are maintained by WGs 120 for control over localization of WT 110 may be performed using various other functions or features as discussed further herein. It will be appreciated that such embodiments may be further understood by way of reference to FIG. 2 (depicting and describing at least some functions which may be supported by LS 130 for at least some such embodiments), FIG. 3 (depicting and describing at least some functions which may be supported by a WG 120 for at least some such embodiments), and FIG. 4 (depicting and describing at least some functions which may be supported by WT 110 for at least some such embodiments).

In at least some embodiments, control over localization of WT 110 may be performed using WGARs 140 for WT 110 that is maintained on the WT 110. As discussed above, the WGARs 140 for WT 110 may have been configured onto WT 110 in various ways (e.g., configured onto LS 130 by a user of WT 110 via a web-based interface to LS 130 and transferred from LS 130 onto WT 110 via a network connection, configured onto a WG 120 by a user of WT 110 via a web-based interface and transferred from the one or more WGs 120 onto WT 110, or the like, as well as various combinations thereof). For purposes of clarity in describing such embodiments, it is assumed that the WGARs 140 for WT 110 are a simple set of rules for a WGW including a single WG 120 (namely, WG 120$_2$). The WT 110 begins in the unconnected state. In the unconnected state, WT 110 may periodically transmit a wireless beacon signal which may be detected by any WG 120 within wireless range of WT 110 and/or WT 110 may listen for a wireless signal from a WG 120 (e.g., a gateway beacon signal, a wake-up signal, or the like). The wireless beacon signal from the WT 110 and the wireless signal from the WG 120 each may be configured to enable location tracking for WT 110 and, thus, for associated object 101. The wireless beacon signal from the WT 110 and the wireless signal from the WG 120 each may be configured such that WT 110 is able to identify the WG 120 that is within wireless range of WT 110 and for which WT 110 is to determine whether a connection should or should not be established. In the case in which WT 110 transmits a wireless beacon signal and the wireless beacon signal is detected by a WG 120, the WG 120 that detects the wireless beacon signal may reply to the wireless beacon signal with a response signal that is configured to enable WT 110 to identify the WG 120 that received the wireless beacon signal (e.g., the response signal includes a GID of the WG 120, the response signal has characteristics unique to the WG 120 and which may be analyzed by the WT 110 to identify the WG 120, or the like). In the case in which the WG 120 transmits a wireless signal that is detected by WT 110, the WT 110 may analyze the wireless signal from the WG to identify the WG 120 (e.g., the wireless signal includes a GID of the WG 120, the wireless signal has characteristics unique to the WG 120 and which may be analyzed by the WT 110 to identify the WG 120, or the like). The wireless beacon signal from the WT 110 and the wireless signal from the WG 120 each optionally may include one or more of additional location tracking information (e.g., a timestamp, a GID of a WG 120 for which the wireless beacon signal is intended, or the like), tag data associated with the WT 110, or the like. In either case, the WT 110 identifies the WG 120 and, thus, can determine whether a connection should or should not be established between WT 110 and the WG 120. In describing such embodiments, assume that WT 110 first comes within wireless range of WG 120$_1$ (which is not on the WGW for WT 110). The WT 110 determines whether WG 120$_1$ is a whitelist wireless gateway for the WT 110 (e.g., on a WGW specified as part of the WGAR 140 for WT 110). The WT 110 performs a lookup on the basis of the identity of WG 120$_1$ (without having to contact WG 120$_1$ or LS 130) to determine whether WG 120$_1$ is a whitelist wireless gateway for WT 110. As noted above, WG 120$_1$ is not a whitelist wireless gateway for the WT 110 and, thus, WT 110 does not initiate establishment of a connection with WG 120$_1$. Additionally, while WT 110 does not initiate establishment of a connection with WG 120$_1$, there may be a determination (e.g., by WT 110, by WG 120$_1$ responsive to a request from WT 110, by LS 130 responsive to a request from WT 110 or WG 120$_1$, or the like) as to whether WGARs 140 for WT 110 (or other associated alert rules) include a rule indicative that the user of WT 110 is to be informed that WT 110 was within wireless range of WG 120$_1$ (e.g., the user of WT 110 is to be informed of locations of WT 110 when WT 110 is not in the connected state, WG 120$_1$ is on an associated blacklist for WT 110, or the like) and, based on a determination that WGARs 140 for WT 110 (or other associated alert rules) include a rule indicative that the user of WT 110 is to be informed that WT 110 was within wireless range of WG 120$_1$, a notification to the user of WT 110 is initiated (e.g., by WT 110 (e.g., via a message to LS 130) where the determination is made by WT 110, by WG 120$_1$ where the determination is made by WG 120$_1$, or the like). In describing such embodiments, assume that WT 110 later comes within wireless range of WG 120$_2$ (which is on the WGW for WT 110). The WT 110 determines whether WG 120$_2$ is a whitelist wireless gateway for the WT 110 (e.g., on a WGW specified as part of the WGAR 140 for WT 110). The WT 110 performs a lookup on the basis of the identity of WG 120$_2$ (without having to contact WG 120$_1$ or LS 130) to determine whether WG 120$_2$ is a whitelist wireless gateway for WT 110. As noted above, WG 120$_2$ is a whitelist wireless gateway for the WT 110 and, thus, WT 110 initiates establishment of a connection with WG 120$_2$. The WT 110 may initiate establishment of a connection with WG 120$_2$ by sending a connection establishment request to WG 120$_2$, sending a message to WG 120$_2$ indicating that WG 120$_2$ should establish a connection with WT 110, or the like. The initiation of establishment of the connection with WG 120$_2$ or the completion of establishment of the connection with WG 120$_2$ causes WT 110 to transition from the unconnected state (in which WT 110 transmits the wireless beacon signal and/or listens for wireless signals from WGs 120) to the connected state (in which WT 110 no longer transmits the wireless beacon signal and/or listens for wireless signals from WGs 120 and, instead, communicates via the connection with WG 120$_2$). The information communicated by the WT 110 in the connected state, as discussed above, may include location tracking information (e.g., one or more of a TID of WT 110, timestamp information, or the like), tag data, or the like, as well as various combinations thereof. Additionally, based on a determination that WT 110 has entered the connected state (e.g., based on an assumption that WT 110 will enter the connected state when WT 110 determines that WG 120$_2$ is a whitelist wireless gateway for the WT 110, based upon detection by WT 110 that the connection between WT 110 and WG 120$_2$ has been successfully established, or the like), there may be a determination (e.g., by WT 110, by WG 120$_2$ responsive to a request from WT 110, by LS 130 responsive to a request from WT 110, or the like) as to whether WGARs 140 for WT 110 (or other associated alert rules) include a rule indicative that the user of WT 110 is to be informed when WT 110 transitions from the unconnected state to the connected state and, based on a determination that the user of WT 110 is to be informed when WT 110 transitions from the unconnected state to the connected state, a notification to the user of WT 110 is initiated (e.g., by WT 110 (e.g., via a message to LS 130), by WG 120$_2$ (e.g., via a message to LS 130 responsive to a request from WT 110), by LS 130, or the like). The WT 110 may remain in the connected state until the connection with WG 120$_2$ is lost, or until some other trigger condition causes WT 110 to transition from the connected state back to the unconnected state (e.g., a quality level of the connection drops below a threshold, an SNR level of wireless signals of WT 110 drops below a threshold, a trigger condition based on temporal conditions, or the like, as well as various combinations thereof). In describing such embodiments, further assume that the connection between WT 110 and WG 120$_2$ is lost (e.g., WT 110 moves out of wireless range of WG 120$_2$, WG 120$_2$ moves out of wireless range of WT 110, or the like) and that WT 110 detects the loss of the connection between WT 110 and WG 120$_2$. The WT 110, based on detection of the loss of the connection between WT 110 and WG 120$_2$, transitions from the connected state back to the unconnected state in which the WT 110 again transmits the wireless beacon signal which may be detected by any of the WGs 120 and/or listens for wireless signals from WGs 120. The WG 120$_2$ also may detect the loss of the connection between WT 110 and WG 120$_2$. The WT 110 or WG 120$_2$ may initiate a process for determining whether the user of WT 110 is to be informed of the transition of WT 110 from the connected state to the unconnected state. Namely, based on a determination that WT 110 has entered the unconnected state, there may be a determination (e.g., by WT 110, by WG 120$_2$ responsive to a request from WT 110, by LS 130 responsive to a request from WG 120$_2$, or the like) as to whether WGARs 140 for WT 110 (or other associated alert rules) include a rule indicative that the user of WT 110 is to be informed when WT 110 transitions from the connected state to the unconnected state and, based on a determination that the user of WT 110 is to be informed when WT 110 transitions from the connected state to the connected state, a notification to the user of WT 110 is initiated (e.g., by WT 110 (e.g., via a message to LS 130), by WG 120$_2$ (e.g., via a message to LS 130) responsive to a request from WT 110, by LS 130 responsive to a request from WT 110, or the like). The use of WGARs 140 for WT 110 that are maintained by WT 110 for control over localization of WT 110 may be performed using various other functions or features as discussed further herein. It will be appreciated that such embodiments may be further understood by way of reference to FIG. 2 (depicting and describing at least some functions which may be supported by LS 130 for at least some such embodiments), FIG. 3 (depicting and describing at least some functions which may be supported by a WG 120 for at least some such embodiments), and FIG. 4 (depicting and describing at least some functions which may be supported by WT 110 for at least some such embodiments).

It will be appreciated that, although primarily described with respect to embodiments in which WT 110 operates within a single state 115 at a time, in at least some embodiments WT 110 may be configured to operate in multiple states at a time. In at least some embodiments, for example, WT 110 may be configured to support multiple sets of states 115 for multiple sets of WGs 120, respectively. In at least some such embodiments, a set of WGs 120 for which WT 110 supports multiple states may include one or more WGs 120 and a set of states 115 associated with the set of WGs 120 may include two or more states (e.g., connected and unconnected as discussed above, or alternatively or including one or more other states which may be supported). As an example, WT 110 may communicate location tracking information using a wireless beacon signal while WT 110 is in an unconnected state for a first WG $120_1$ while also communicating location tracking information via a connection with a second WG $120_2$ while WT 110 is in a connected state for the second WG $120_2$. For example, where the WT 110 is tracking a child, the WGARs 140 for WT 110 may be configured such that WT 110 maintains state for a smartphone of a babysit and for a WiFi access point of a day care center where the babysitter is supposed to drop the child, such that the WT 110 may be (1) in a connected state with the smartphone of the babysitter and an unconnected state with the WiFi access point of the day care center before the babysitter arrives at the day care center, (2) in connected states with both the smartphone of the babysitter and the WiFi access point of the day care center while the babysitter is dropping the child at the day care center, and (3) in a connected state with the WiFi access point of the day care center and an unconnected state with the smartphone of the babysitter after the babysitter drops the child at the day care center. In continuation of this example where the WT 110 is tracking a child, the WGARs 140 for WT 110 may include an additional rule indicating that an alert is not generated for the child as long as the WT 110 is in a connected state for at least one of the two WGs 120 (namely, at least one of the smartphone of the babysitter and the WiFi access point of the day care center). From this example, it will be appreciated how hierarchies of rules may be defined as part of the WGARs 140 for WT 110, where the rules may correspond to rules related to state transitions for specific WGs 120, rules related to the combination of states of the WT 110 with respect to multiple WGs 120 or multiple groups of WGs 120, or the like, as well as various combinations thereof.

It will be appreciated that, although primarily depicted and described with respect to specific states, other states may be supported. For example, it will be appreciated that, although primarily depicted and described with respect to embodiments in which WT 110 is configured to support specific states (namely, unconnected and connected), WT 110 may be configured to support other states. It will be appreciated that, although primarily depicted and described with respect to specific mechanisms for communicating location tracking information, other mechanisms for communicating location tracking information may be supported. For example, it will be appreciated that, although primarily depicted and described with respect to embodiments in which WT 110 is configured to communicate location tracking information in specific ways (namely, using a wireless beacon signal or via a connection), WT 110 may be configured to communicate location tracking information in other ways.

It will be appreciated that, although primarily depicted and described herein with respect to embodiments in which the wireless gateway association information is composed of wireless gateway association rules including specific types of information and rules in particular arrangements, the wireless gateway association rules may include various other types of information and rules, the wireless gateway association rules may be organized using various other arrangements, the wireless gateway association information may include various other types of information and rules, or the like, as well as various combinations thereof.

Figure 2:
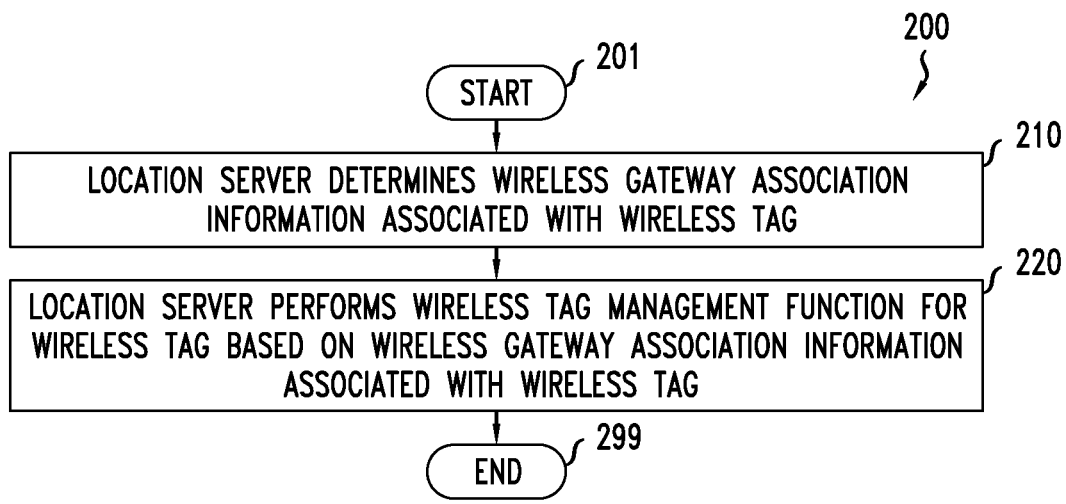
FIG. 2 depicts a method for use by a location server to facilitate communication of location tracking information for a wireless tag based on wireless gateway association information associated with the wireless tag.

FIG. 2 depicts a method for use by a location server to facilitate communication of location tracking information for a wireless tag based on wireless gateway association information associated with the wireless tag. It will be appreciated that, although primarily depicted and described as being performed serially, at least a portion of the steps of method 200 may be performed contemporaneously or in a different order than as presented in FIG. 2. At step 201, method 200 begins. At step 210, the location server determines wireless gateway association information associated with the wireless tag. At step 220, the location server performs a wireless tag management function for the wireless tag based on the wireless gateway association information associated with the wireless tag. At step 299, method 200 ends. It will be appreciated that the wireless gateway association information may include WGWs, WGBs, or the like, as well as various combinations thereof. It will be appreciated that method 200 of FIG. 2 may be further understood when considered in conjunction with the description of FIG. 1 and, further, that method 200 may be adapted to include various functions depicted and described with respect to FIG. 1 as being performed by LS 130.

Figure 3:
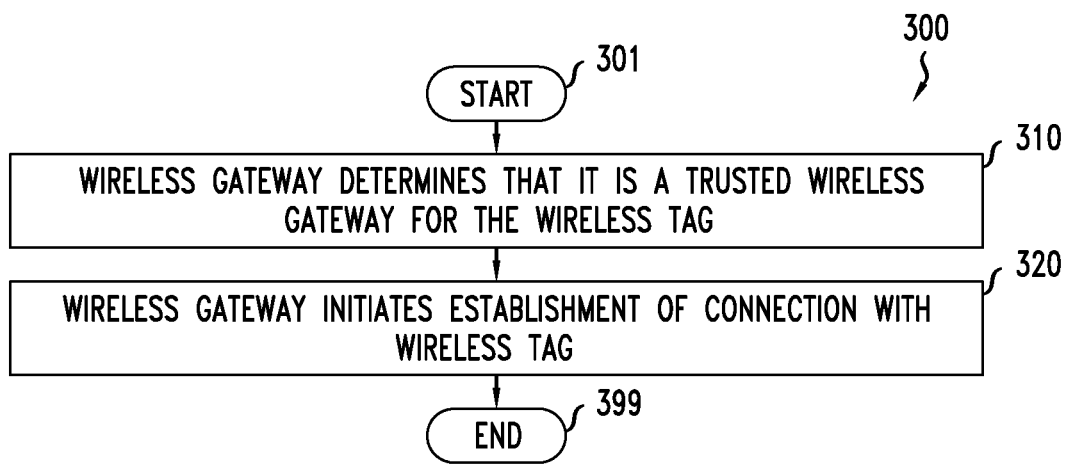
FIG. 3 depicts a method for use by a wireless gateway to facilitate communication of location tracking information for a wireless tag based on wireless gateway association information associated with the wireless tag.

FIG. 3 depicts a method for use by a wireless gateway to facilitate communication of location tracking information for a wireless tag based on wireless gateway association information associated with the wireless tag. It will be appreciated that, although primarily depicted and described as being performed serially, at least a portion of the steps of method 300 may be performed contemporaneously or in a different order than as presented in FIG. 3. At step 301, method 300 begins. At step 310, the wireless gateway determines that it is a trusted wireless gateway for the wireless tag. The wireless gateway may determine that it is a trusted wireless gateway for the wireless tag based on wireless gateway association information, automated authentication techniques, or the like. At step 320, the wireless gateway initiates establishment of a connected with the wireless tag based on the determination that it is a trusted wireless gateway for the wireless tag. At step 399, method 300 ends. It will be appreciated that the wireless gateway association information may include WGWs, WGBs, or the like, as well as various combinations thereof. It will be appreciated that method 300 of FIG. 3 may be further understood when considered in conjunction with the description of FIG. 1 and, further, that method 300 may be adapted to include various functions depicted and described with respect to FIG. 1 as being performed by WGs 120.

Figure 4:
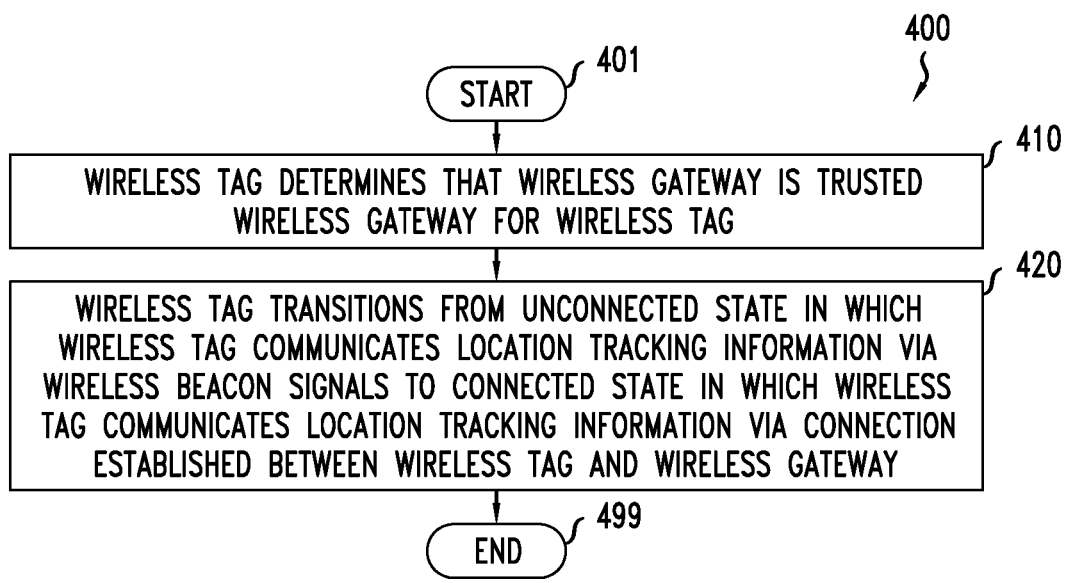
FIG. 4 depicts a method for use by a wireless tag to facilitate communication of location tracking information for the wireless tag.

FIG. 4 depicts a method for use by a wireless tag to facilitate communication of location tracking information for the wireless tag. It will be appreciated that, although primarily depicted and described as being performed serially, at least a portion of the steps of method 400 may be performed contemporaneously or in a different order than as presented in FIG. 4. At step 401, method 400 begins. At step 410, the wireless tag determines that a wireless gateway is a trusted wireless gateway for the wireless tag. The wireless tag may determine that the wireless gateway is a trusted wireless gateway for the wireless tag based on wireless gateway association information, automated authentication techniques, or the like. At step 420, the wireless tag transitions from an unconnected state in which the wireless tag communicates location tracking information via wireless beacon signals to a connected state in which the wireless tag communicates location tracking information via a connection established between the wireless tag and the wireless gateway. It will be appreciated that the wireless gateway association information may include WGWs, WGBs, or the like, as well as various combinations thereof. It will be appreciated that method 400 of FIG. 4 may be further understood when considered in conjunction with the description of FIG. 1 and, further, that method 400 may be adapted to include various functions depicted and described with respect to FIG. 1 as being performed by WT 110.

It will be appreciated that, although primarily depicted and described with respect to embodiments in which wireless gateway association rules for a wireless tag define the sets of wireless gateways trusted for the wireless tag, in at least some embodiments one or more wireless gateways trusted for the wireless tag may be identified based on one or more automatic authentication techniques. For example, certificates may be used for enabling a wireless tag to identify wireless gateways that are trusted for the wireless tag (e.g., similar to the concept of a trusted wireless gateway being on a WGW for the wireless tag), to identify wireless gateways that are distrusted for the wireless tag (e.g., similar to the concept of a distrusted wireless gateway being on a WGB for the wireless tag), or the like, as well as various combinations thereof. It will be appreciated that other types of automatic authentication techniques may similarly be applied for determining the status of wireless gateways with respect to the wireless tag (e.g., trusted, distrusted, or the like).

It will be appreciated that, although primarily depicted and described with respect to embodiments in which management functions performed by a user associated with a wireless tag include management of wireless gateway association rules for the wireless tag, various other management functions may be supported for the user or users associated with a wireless tag. For example, a user associated with a wireless tag may access a web interface in order to monitor the location of the wireless tag (e.g., via a representation of the tag using an icon or other suitable indicator overlaid on a map). For example, a user associated with a wireless tag may access a web interface in order to initiate a user ping operation in which the location server pings wireless gateways for location information of the wireless tag. It will be appreciated that, although primarily presented with respect to embodiments in which a wireless tag has a single user associated therewith, multiple users may be associated with a tag and the multiple users may have the same or different levels of permission for tag management (e.g., one user only may be permitted to monitor the location of the wireless tag, while another user may be permitted to monitor the location of the wireless tag and also to change the wireless gateway association rules (e.g., WGW, WGB, notification rules, or the like) for the wireless tag).

It will be appreciated that, although primarily depicted and described herein with respect to embodiments in which the wireless gateway association information for a wireless tag includes wireless gateway association rules (e.g., WGARs 140 of FIG. 1), the wireless gateway association information for a wireless tag may include various other types of information. It will be appreciated that, although primarily depicted and described herein with respect to embodiments in which the wireless gateway association information for a wireless tag includes list-based information (e.g., WGWs, WGBs, or the like) and rule-based information (e.g., association rules, notification rules, or the like), the wireless gateway association information for a wireless tag may be provided in various other formats or arrangements (e.g., using non-list-based formats or arrangements, using non-rule-based formats or arrangements, using various other forms of rules or other specifications of such rule-type information, or the like, as well as various combinations thereof).

Figure 5:
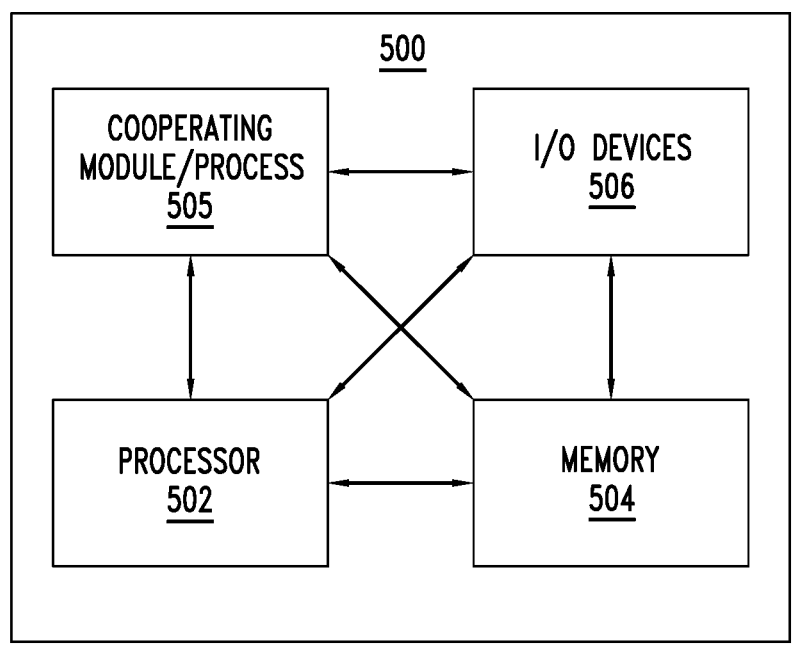
FIG. 5 depicts a high-level block diagram of a computer suitable for use in performing functions presented herein.

FIG. 5 depicts a high-level block diagram of a computer suitable for use in performing functions described herein.

The computer 500 includes a processor 502 (e.g., a central processing unit (CPU) or other suitable processor(s)) and a memory 504 (e.g., random access memory (RAM), read only memory (ROM), or the like).

The computer 500 also may include a cooperating module/process 505. The cooperating process 505 can be loaded into memory 504 and executed by the processor 502 to implement functions as discussed herein and, thus, cooperating process 505 (including associated data structures) can be stored on a computer readable storage medium, e.g., RAM memory, magnetic or optical drive or diskette, and the like.

The computer 500 also may include one or more input/output devices 506 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 500 depicted in FIG. 5 provides a general architecture and functionality suitable for implementing functional elements described herein and/or portions of functional elements described herein. For example, computer 500 provides a general architecture and functionality suitable for implementing one or more of WT 110, a portion of WT 110, a WG 120, a portion of a WG 120, LS 130, a portion of LS 130, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. A wireless gateway, comprising:
   at least one processor; and
   at least one memory including computer program code;
   wherein the at least one memory and the computer program code are configured to, with the at least one processor, cause the wireless gateway to at least:
   receive, from a wireless tag, a wireless beacon signal;
   determine, based on the wireless beacon signal, whether the wireless gateway is a trusted wireless gateway for the wireless tag; and
   initiate, based on a determination that the wireless gateway is a trusted wireless gateway for the wireless tag, establishment of a connection between the wireless tag and the wireless gateway.

2. The wireless gateway of claim 1, wherein, to determine whether the wireless gateway is a trusted wireless gateway for the wireless tag, the at least one memory and the computer program code are configured to, with the at least one processor, cause the wireless gateway to at least:
   determine, based on the wireless beacon signal, an identity of the wireless tag;
   send, toward a location server, an indication of the identity of the wireless tag; and
   determine, based on a response from the location server, whether the wireless gateway is a trusted wireless gateway for the wireless tag.

3. The wireless gateway of claim 2, wherein the identity of the wireless tag is determined based on at least one of analysis of one or more wireless characteristics of the wireless beacon signal or information included within the wireless beacon signal.

4. The wireless gateway of claim 1, wherein, to determine whether the wireless gateway is a trusted wireless gateway for the wireless tag, the at least one memory and the computer program code are configured to, with the at least one processor, cause the wireless gateway to at least:
   determine, based on the wireless beacon signal, an identity of the wireless tag; and
   determine, based the identity of the wireless tag and based on information maintained by the wireless gateway that is indicative of a set of wireless tags for which the wireless gateway is a trusted wireless gateway, whether the wireless gateway is a trusted wireless gateway for the wireless tag.

5. The wireless gateway of claim 4, wherein the identity of the wireless tag is determined based on at least one of analysis of one or more wireless characteristics of the wireless beacon signal or information included within the wireless beacon signal.

6. The wireless gateway of claim 1, wherein the at least one memory and the computer program code are configured to, with the at least one processor, cause the wireless gateway to at least:
   receive, from the wireless tag via the connection between the wireless tag and the wireless gateway, information of the wireless tag; and
   send, toward a location server, at least a portion of the information of the wireless tag.

7. The wireless gateway of claim 6, wherein the information of the wireless tag includes at least one of an identifier of the wireless tag, location tracking information of the wireless tag, or data collected by the wireless tag.

8. The wireless gateway of claim 6, wherein the at least one memory and the computer program code are configured to, with the at least one processor, cause the wireless gateway to at least:
   determine location tracking information for the wireless tag; and
   send, toward the location server, the location tracking information for the wireless tag.

9. The wireless gateway of claim 1, wherein the at least one memory and the computer program code are configured to, with the at least one processor, cause the wireless gateway to at least:
   determine location tracking information for the wireless tag; and
   send, toward the location server, the location tracking information for the wireless tag.

10. The wireless gateway of claim 9, wherein the location tracking information for the wireless tag comprises at least one of an identifier of the wireless gateway, a location of the wireless gateway, or an indication that the wireless tag is within a vicinity of the wireless gateway.

11. The wireless gateway of claim 1, wherein the at least one memory and the computer program code are configured to, with the at least one processor, cause the wireless gateway to at least:
   receive, from the wireless tag via the connection between the wireless tag and the wireless gateway, location tracking information determined by the wireless tag;
   generate, based on receipt of the location tracking information determined by the wireless tag, location tracking information determined by the wireless gateway; and
   send, toward the location server, the location tracking information determined by the wireless gateway.

12. The wireless gateway of claim 1, wherein the at least one memory and the computer program code are configured to, with the at least one processor, cause the wireless gateway to at least:
   receive, from the wireless tag via the connection between the wireless tag and the wireless gateway, location tracking information determined by the wireless tag;
   determine, based on the location tracking information determined by the wireless tag, a location of the wireless tag; and
   send, toward the location server, an indication that the wireless tag is within a vicinity of the wireless gateway.

13. The wireless gateway of claim 1, wherein the at least one memory and the computer program code are configured to, with the at least one processor, cause the wireless gateway to at least:
   transmit, via the connection between the wireless tag and the wireless gateway, heartbeat signals; or
   monitor for receipt of heartbeat signals via the connection between the wireless tag and the wireless gateway.

14. The wireless gateway of claim 1, wherein the at least one memory and the computer program code are configured to, with the at least one processor, cause the wireless gateway to at least:
   initiate, based on a determination that a heartbeat signal has not been received via the connection between the wireless tag and the wireless gateway for a threshold length of time, termination of the connection between the wireless tag and the wireless gateway.

15. A method, comprising:
   receiving, by a wireless gateway from a wireless tag, a wireless beacon signal;

determining, by the wireless gateway based on the wireless beacon signal, whether the wireless gateway is a trusted wireless gateway for the wireless tag; and initiating, by the wireless gateway based on a determination that the wireless gateway is a trusted wireless gateway for the wireless tag, establishment of a connection between the wireless tag and the wireless gateway.

* * * * *